United States Patent
Gretz

(10) Patent No.: US 8,124,873 B1
(45) Date of Patent: *Feb. 28, 2012

(54) CABLE ROUTING ASSEMBLY INCLUDING PROTECTIVE CABLE FRAME

(75) Inventor: Thomas J. Gretz, Port St. Lucie, FL (US)

(73) Assignee: Arlington Industries, Inc., Scranton, PA (US)

( * ) Notice: Subject to any disclaimer, the term of this patent is extended or adjusted under 35 U.S.C. 154(b) by 435 days.

This patent is subject to a terminal disclaimer.

(21) Appl. No.: 12/456,550

(22) Filed: Jun. 18, 2009

(51) Int. Cl.
*H05K 5/03* (2006.01)

(52) U.S. Cl. .............. 174/66; 174/67; 174/53; 220/241; 220/242

(58) Field of Classification Search ............... 174/53, 174/58, 63, 64, 66, 67, 61, 135, 665, 668, 174/72 A, 659; 220/241, 242, 3.2, 3.8; 439/131, 439/135, 144; 248/300, 342, 49, 48.1, 200; 385/134, 135; D13/155, 133, 154
See application file for complete search history.

(56) References Cited

U.S. PATENT DOCUMENTS

| | | | | |
|---|---|---|---|---|
| 4,638,963 A * | 1/1987 | Hernandez | ...................... | 174/58 |
| 4,688,747 A | 8/1987 | Helmsdorfer et al. | | |
| 4,863,399 A | 9/1989 | Medlin, Jr. | | |
| 6,093,890 A * | 7/2000 | Gretz | .............. | 174/58 |
| 6,102,360 A | 8/2000 | Clegg et al. | | |
| 6,508,445 B1 | 1/2003 | Rohmer | | |
| 6,750,398 B1 * | 6/2004 | Richardson | ...................... | 174/58 |
| 6,793,524 B2 * | 9/2004 | Clark et al. | .................... | 439/536 |
| 7,048,575 B2 * | 5/2006 | Kidman | ......................... | 174/53 |
| 7,282,645 B2 * | 10/2007 | Locke | ........................ | 174/72 A |
| 7,390,964 B2 | 6/2008 | Gorin et al. | | |
| 7,563,979 B1 * | 7/2009 | Gretz | ............................. | 174/66 |
| 7,847,190 B1 * | 12/2010 | Gretz | ............................. | 174/66 |
| 7,897,870 B1 * | 3/2011 | Gretz | ............................. | 174/58 |

* cited by examiner

*Primary Examiner* — Angel R Estrada

(57) ABSTRACT

A cable routing assembly for providing a portal for routing low voltage cables through a wall. The cable routing assembly includes a protective cable frame, a low voltage mounting bracket, and a cover plate. The low voltage mounting bracket includes two adjustable flags for attachment to a wall. The protective cable frame includes two arms with apertures therein to enable mounting directly to the low voltage mounting bracket. Bores in the arms of the protective cable frame enable receipt of fasteners for mounting the cover plate thereto. An opening in the protective cable frame is capable of receiving low voltage cables for routing through the wall and into an adjacent room. The surface of the cable frame opening includes a rounded surface to provide a gentle bend radius to any cables routed through the cable frame.

16 Claims, 9 Drawing Sheets

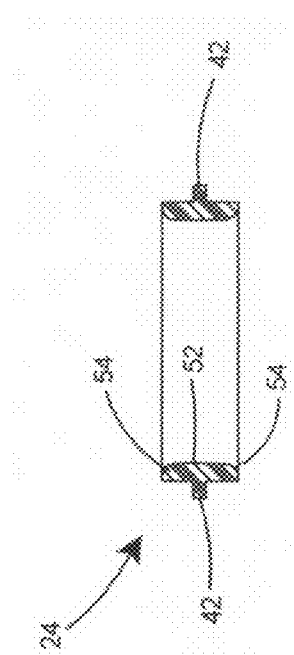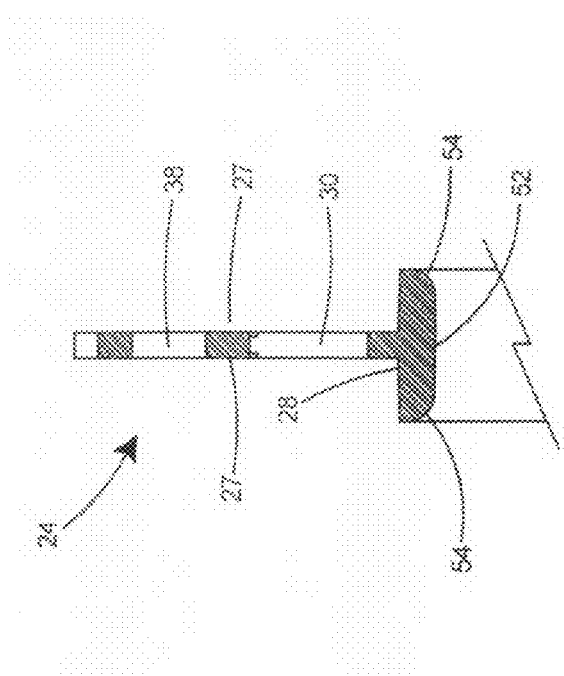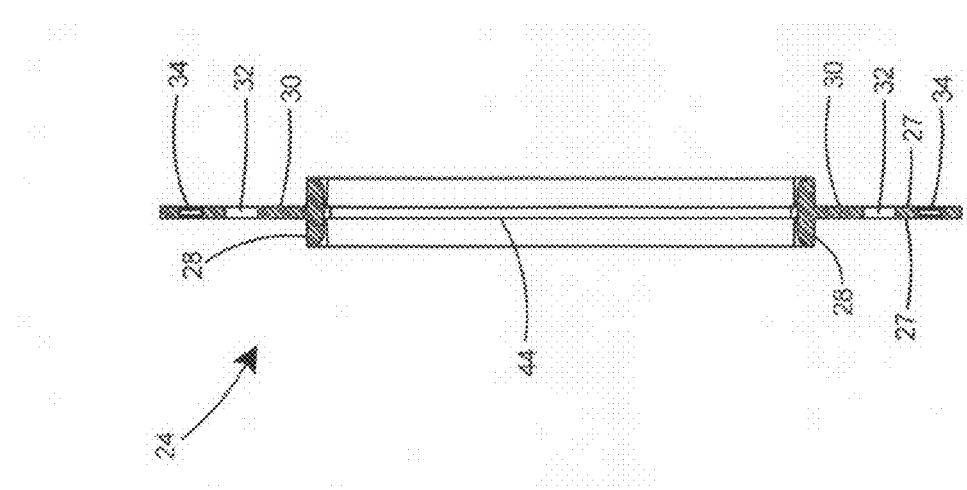

CABLE ROUTING ASSEMBLY INCLUDING PROTECTIVE CABLE FRAME

FIELD OF THE INVENTION

This invention relates to the installation of low voltage wiring in buildings and specifically to a protective cable frame for use with a low voltage bracket or an electrical box and a decorative cover plate for routing low voltage electrical or communications cables through walls of buildings.

BACKGROUND OF THE INVENTION

A wide variety of low voltage components such as telephone cables, coax cables for television and interne service, wiring for home entertainment systems and surround sound, and cables for connecting computers to peripherals such as printers and facsimile machines, are prevalent in today's homes and offices. Frequently it is necessary to route these low voltage wires and cables through interior walls in order to connect low voltage components in separate rooms.

In some cases, holes are simply made in the baseboard or walls and low voltage cables are simply routed through the holes. However, this is an unsightly solution and detracts from the overall appearance of the building.

U.S. patent application Ser. No. 12/384,423, sharing inventorship with the present invention, disclosed a cable routing assembly including a low voltage bracket and a scoop or frame for acting as a sight barrier for substantially blocking the view of low voltage or communication cables entering the wall.

Although several cable routing devices with sight barriers have been proposed for routing cables through walls, there are also situations in which the primary concern is accommodating a large number of cables and providing a safe opening through the wall. What is needed therefore is a cable routing device that provides an attractive wall portal for low voltage cables. The cable routing device should be capable of accommodating a large number of cables while providing a gradual or gentle bend radius to the cables passing through the device. The cable routing device should further provide a cable portal that is visually pleasing to the homeowner.

SUMMARY OF THE INVENTION

The invention is a cable routing assembly for providing a wall portal for routing low voltage cables there through. The cable routing assembly includes a protective cable frame, a low voltage mounting bracket, and a cover plate. The low voltage mounting bracket includes two adjustable flags for attachment to a wall. A frame portion including arms and two outward extending ears with apertures therein is provided on the protective cable frame to enable mounting directly to the low voltage mounting bracket. Bores in the arms of the protective cable frame enable receipt of fasteners for mounting a cover plate thereto. An opening in the protective cable frame is capable of receiving low voltage cables for the purpose of routing them through the wall and into an adjacent room. The surface of the cable frame opening includes a rounded surface to provide a gentle bend radius to any cables routed through the cable frame.

OBJECTS AND ADVANTAGES

Several advantages are achieved with the cable routing assembly of the present invention, including:

(1) The cable routing assembly provides a portal for routing low voltage wires and cables through walls.

(2) The cable routing assembly accommodates standard DECORA® cover plates, which are available from Leviton Manufacturing Company, Little Neck, N.Y.

(3) As a result of using conventional decora cover plates, the cable routing assembly for a single gang electrical box does not require the manufacture of a specially designed cover plate.

(4) Only a simple rectangular hole is required for mounting the cable routing assembly in a wall.

(5) No additional apertures or screw holes are required to be made in the wall for installation as rotatable flags are available to clamp the low voltage mounting bracket portion of the cable routing assembly to the wall.

(6) The cable routing assembly includes a protective cable frame with an opening having an inner periphery, a center, and a curved surface extending away from each side of the center, the curved surfaces thereby providing a gradual bend radius to any cables extending through the opening of the protective cable frame and protecting the cables from abrasion caused by movement of the cables with respect to the opening.

(7) The cable routing assembly provides a wide opening for accommodating a plurality of cables.

These and other objects and advantages of the present invention will be better understood by reading the following description along with reference to the drawings.

DESCRIPTION OF THE DRAWINGS

FIG. 4 is a sectional view of the protective cable frame taken along line 4-4 of FIG. 2.

FIG. 5 is a sectional view of the protective cable frame taken along line 5-5 of FIG. 2.

FIG. 6 is a sectional view of the protective cable frame taken along line 6-6 of FIG. 2.

INDEX TO REFERENCE NUMERALS IN DRAWINGS

| | |
|---|---|
| 20 | cable routing assembly |
| 22 | low voltage mounting bracket |
| 24 | protective cable frame or insert |
| 25 | frame member |
| 26 | cover plate |
| 27 | side of frame member |
| 28 | end of cable frame |
| 30 | arm |
| 32 | first aperture or bore in arm |
| 34 | second aperture or bore in arm |
| 36 | ear |
| 38 | aperture in ear |
| 40 | outer periphery of cable frame |
| 42 | longitudinal flange |
| 44 | inner periphery of cable frame |
| 46 | opening in cable frame |
| 48 | forward peripheral flange |
| 50 | rearward peripheral flange |
| 52 | center of inner periphery |
| 54 | curved surface |
| 56 | mounting arrangement |
| 58 | rotatable flag |
| 60 | frame member of low voltage mounting bracket |
| 62 | face flange |
| 64 | outer periphery of frame portion of low voltage mounting bracket |
| 66 | inner periphery of frame portion of low voltage mounting bracket |
| 68 | opening |
| 70 | collar |
| 72 | boss on low voltage mounting bracket |
| 74 | first bore |
| 76 | second bore |
| 78 | mounting fastener |
| 80 | distal end of mounting fastener |
| 82 | tab |
| 84 | leg |
| 86 | proximal end of rotatable flag |
| 88 | distal end of rotatable flag |
| 90 | bore |
| 92 | foot |
| 94 | flat face |
| 96 | aperture in face flange of low voltage mounting bracket |
| 98 | front side of cover plate |
| 100 | rear side of cover plate |
| 102 | opening in cover plate |
| 103 | flat portion |
| 104 | outer edge of cover plate |
| 106 | peripheral wall |
| 108 | aperture in cover plate |
| 110 | vertical axis |
| 112 | countersunk area |
| 114 | recessed area of cover plate |
| 116 | wall or wallboard |
| 118 | first fastening arrangement |
| 120 | fastener |
| 122 | second fastening arrangement |
| 124 | fastener |
| 126 | electrical box |
| 128 | bores |
| D1 | depth of recessed area of cover plate |
| T1 | thickness of face flange of the low voltage mounting bracket |

DETAILED DESCRIPTION OF THE INVENTION

Figure 11:
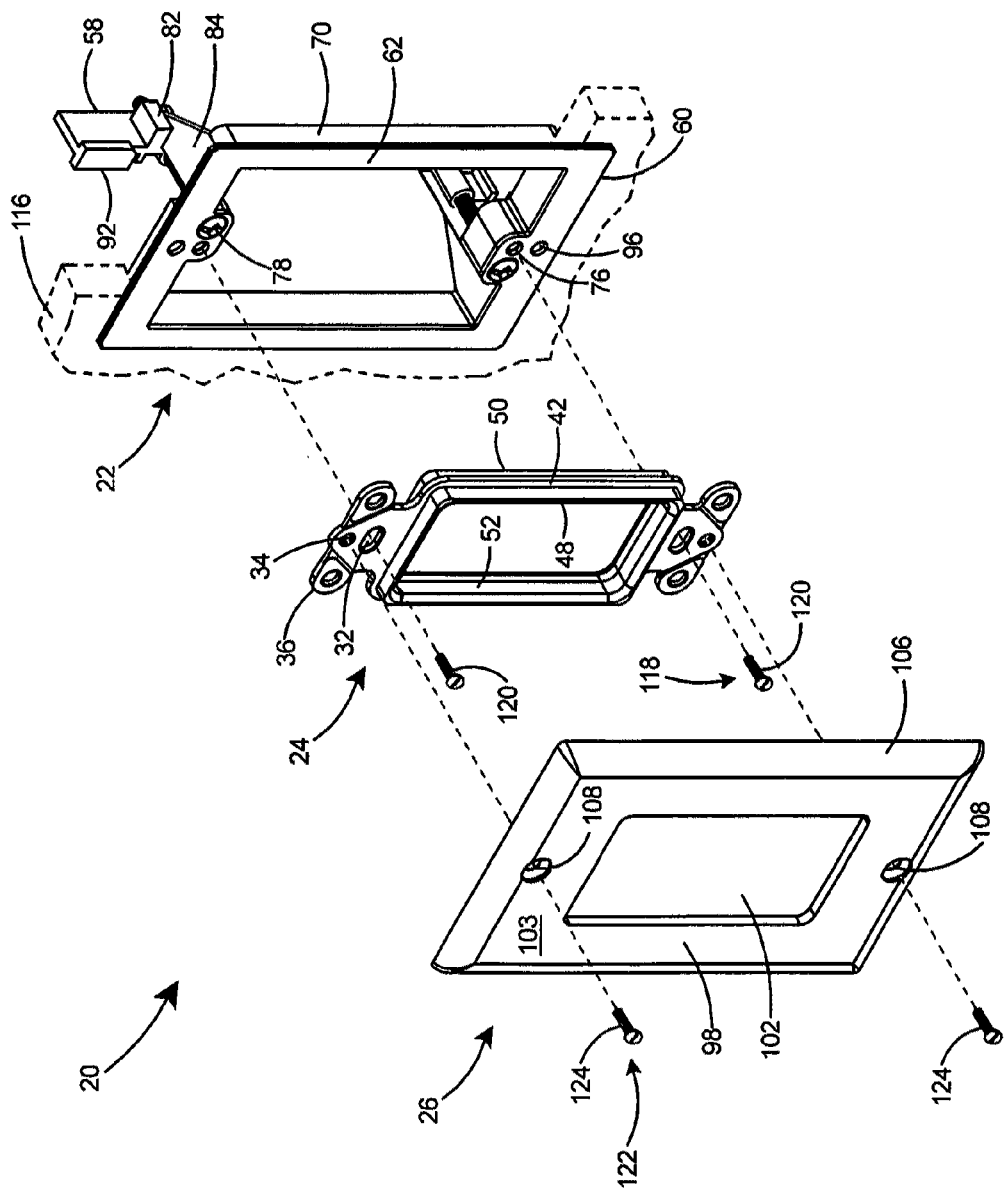
FIG. 11 is an exploded perspective view of the cable routing assembly of the present invention including the low voltage mounting bracket, the protective cable

Referring to FIG. 11 there is shown a preferred embodiment of a cable routing assembly 20 according to the present invention. The cable routing assembly 20 includes a low voltage mounting bracket 22, an insert or protective cable frame 24, and a cover plate 26.

Figure 1:
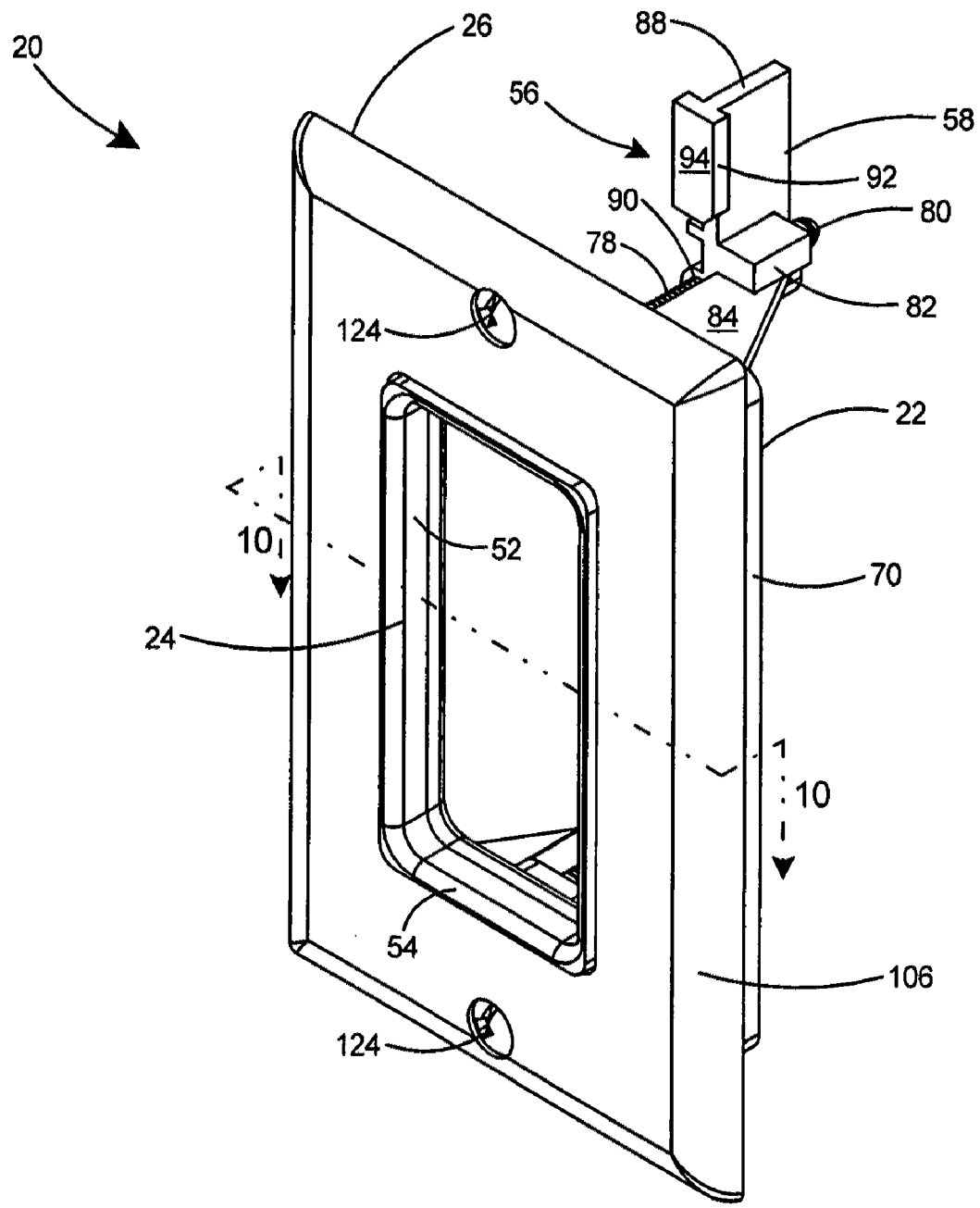
FIG. 1 is a perspective view of the preferred embodiment of a cable routing assembly according to the present invention.
Figure 3:
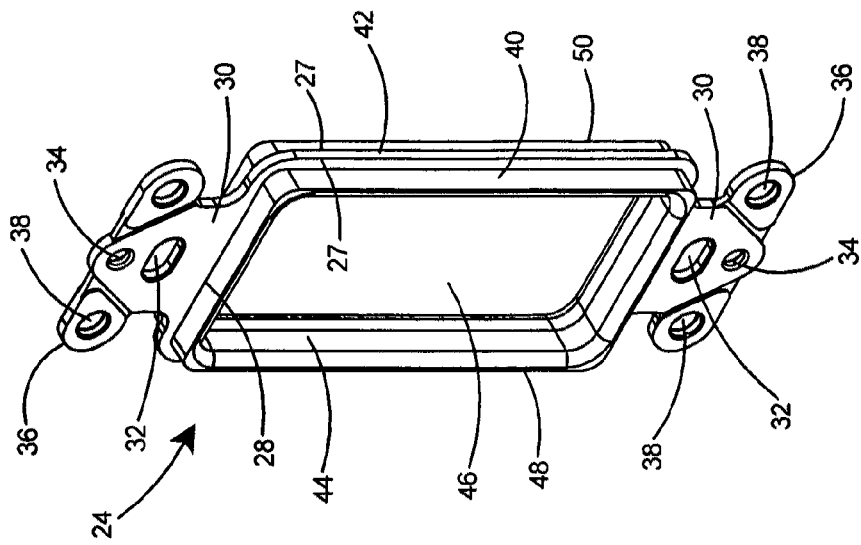
FIG. 3 is a perspective view of the protective cable frame of FIG. 2.
Figure 2:
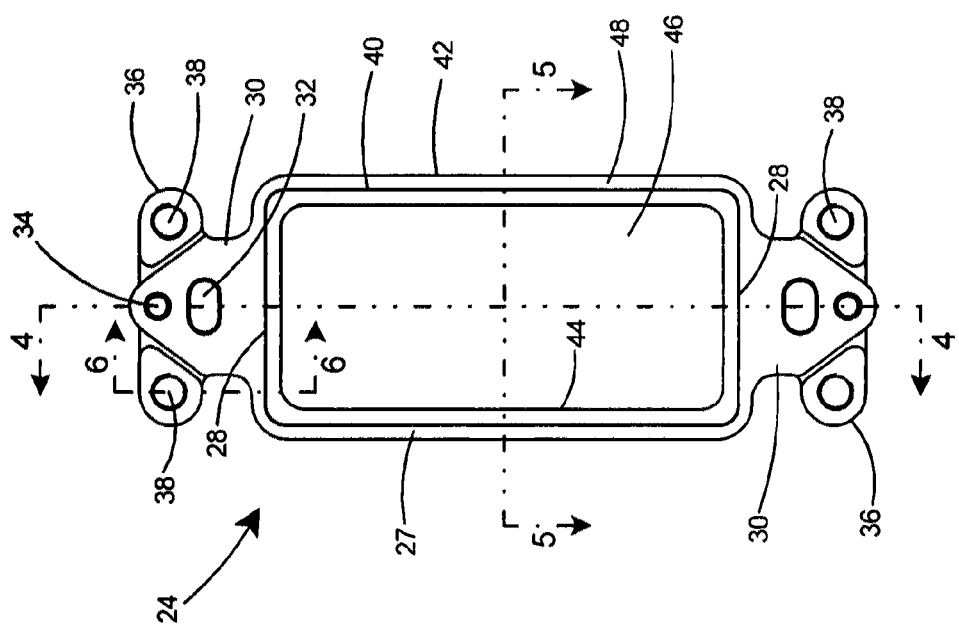
FIG. 2 is a front elevation view of a protective cable frame that forms a portion of the cable routing assembly of FIG. 1.

With reference to FIGS. 2 and 3, the protective cable frame 24 includes a substantially rectangular one-piece frame member 25 having two sides 27, two ends 28 and an arm 30 extending from each of the ends 28. Each of the arms 30 includes a first aperture therein 32 and a second aperture 34 outward of the first aperture 32. The protective cable frame 24 further includes two ears 36 extending laterally from each arm 30 and an aperture 38 in each ear 36. The protective cable frame 24 further includes an outer periphery 40 and a longitudinal flange 42 extending around the outer periphery 40. The longitudinal flange 42 is coplanar with each of the arms 30. The protective cable frame 24 includes an inner periphery 44 and an opening 46 within the inner periphery 44. The longitudinal flange 42 divides the protective cable frame 24 into a forward peripheral flange 48 and a rearward peripheral flange 50. As shown in FIGS. 4-6, the inner periphery 44 of the protective cable frame 24 includes a center 52 and curved surfaces 54 that curve away from the center 52.

Figure 7:
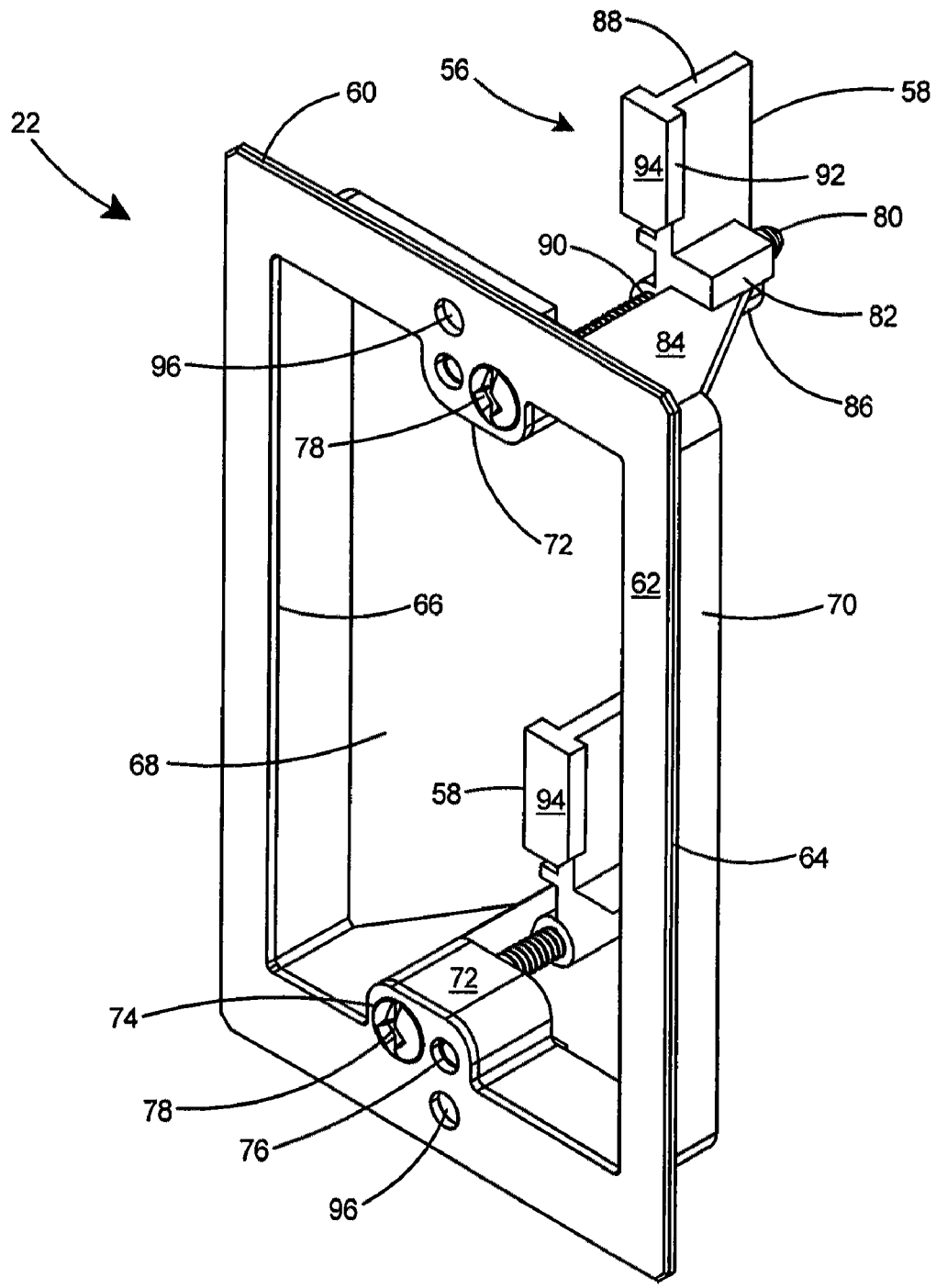
FIG. 7 is a perspective view of a low voltage mounting bracket that forms a portion of the cable routing assembly of FIG. 1.

Referring to FIG. 7 there is shown a low voltage mounting bracket 22 that forms a portion of the cable routing assembly of the present invention. The low voltage mounting bracket 22 includes a mounting arrangement 56 for securing the low voltage mounting bracket 22 to a wall. The mounting arrangement 56 includes a plurality of rotatable flags 58 that are capable of being rotated from a retracted orientation to an extended orientation. FIG. 7 depicts the top rotatable flags 58 in the figure rotated to the extended orientation and the bottom rotatable flag 58 rotated to the retracted orientation.

The low voltage bracket 22 includes a rectangular shaped one-piece frame member 60 with a face flange 62 having an outer periphery 64, an inner periphery 66, and a substantially rectangular opening 68 therein. A collar 70 extends rearward from the inner periphery 66 of the face flange 62. The face flange 62 of the low voltage mounting bracket 22 includes two bosses 72 extending inward of the inner periphery 66 into the opening 68. Each of the bosses 72 include a first bore 74 and a second bore 76. The first 74 and second bores 76 are positioned side by side in each boss 72.

The mounting arrangement 56 includes a mounting fastener 78 extending through the first bore 74 in each of the bosses 72 in the face flange 62 of the low voltage mounting bracket 22. A rotatable flag 58 having a tab 82 thereon is secured to the distal end 80 of each of the mounting fasteners 78. The low voltage mounting bracket 22 includes a leg 84 that is integral with the frame member 60 and is located adjacent each of the rotatable flags 58 and tabs 82. The legs 84 extend rearward from the face flange 62 of the low voltage mounting bracket 22. The rotatable flags 58 include a proximal end 86, a distal end 88, and a bore 90 in the proximal end 86. The distal end 88 of the rotatable flags 58 includes a foot 92 with a flat face 94 for engaging a wall with tightening of the mounting arrangement 56. Apertures 96 are included in the face flange 62 of the low voltage mounting bracket 22.

Figure 8:
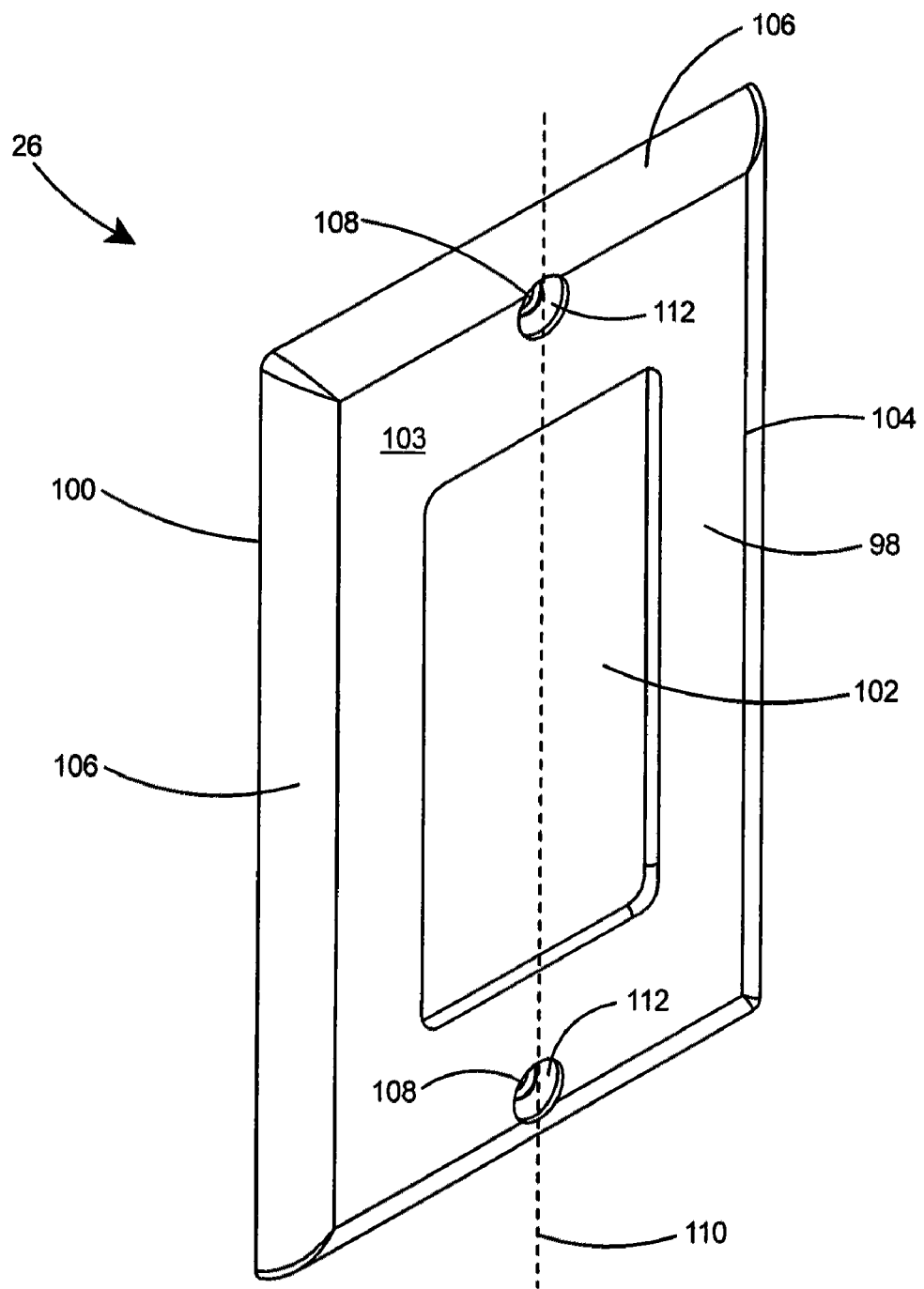
FIG. 8 is a perspective view of a decorative cover plate that forms a portion of the cable routing assembly of FIG. 1.

With reference to FIG. 8, the cover plate 26 is substantially rectangular shaped and includes a front side 98, a rear side 100, an opening 102 therein, and a flat portion 103 on the front side 98. The cover plate 26 includes an outer edge 104, a peripheral wall 106 around the outer edge 104, and two apertures 108 aligned along a vertical axis 110 through the cover plate 26. Countersunk areas 112 are provided in the front side 98 of the cover plate 26 surrounding the apertures 108.

Figure 9:
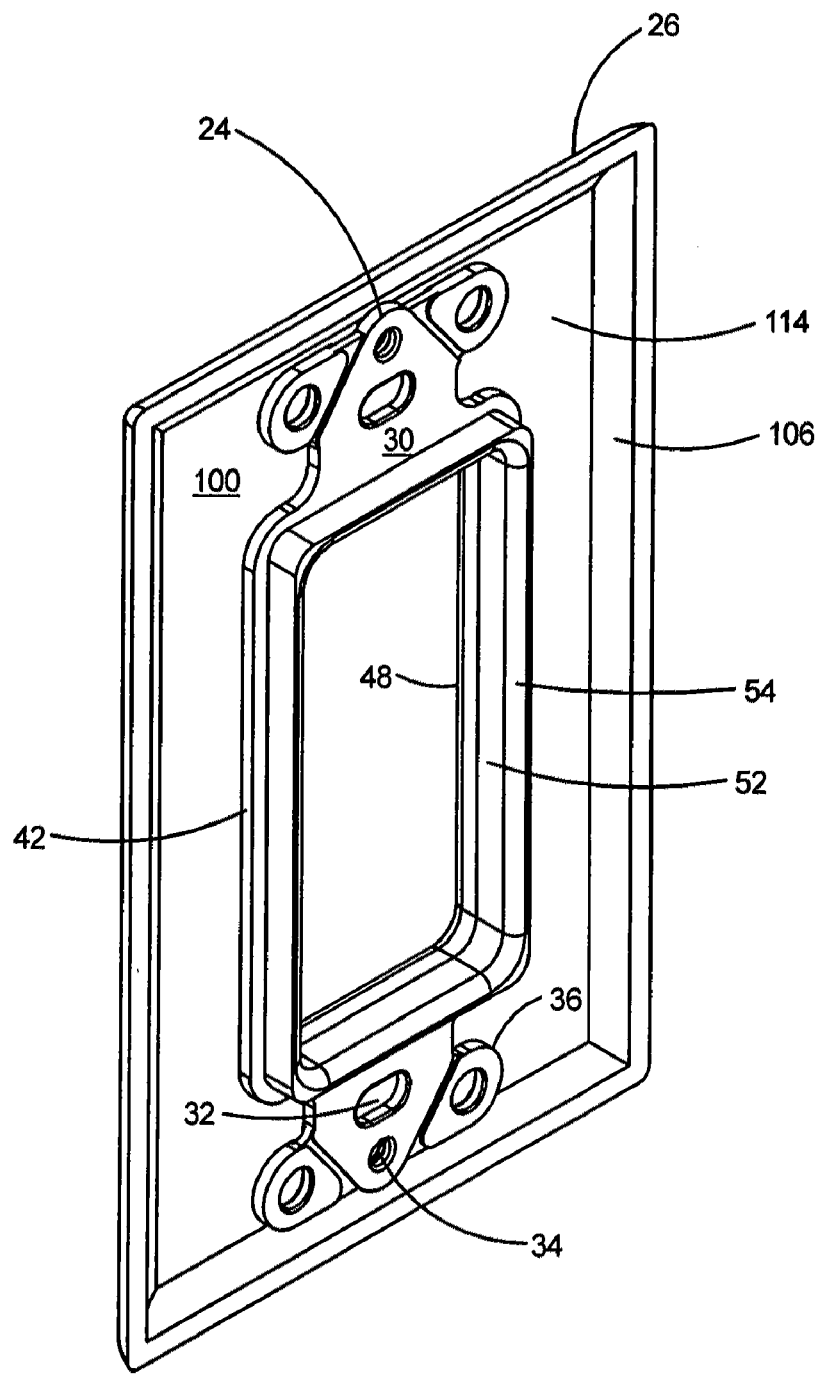
FIG. 9 is a rear perspective view of a portion of the cable routing assembly of the present invention including the protective frame member flush against the back of the decorative cover plate.

As shown in FIG. 9, the peripheral wall 106 creates a recessed area 114 on the rear side 100 of the cover plate 26. The recessed area 114 is of sufficient depth to accept the forward peripheral flange 48 and longitudinal flange 42 of the protective cable frame 24 when the cover plate 26 is secured to the protective cable frame 24. The protective cable frame 24 fits entirely within the recessed area 114 of the cover plate 26 when the cover plate 26 is secured to the protective cable frame 24.

Figure 10:
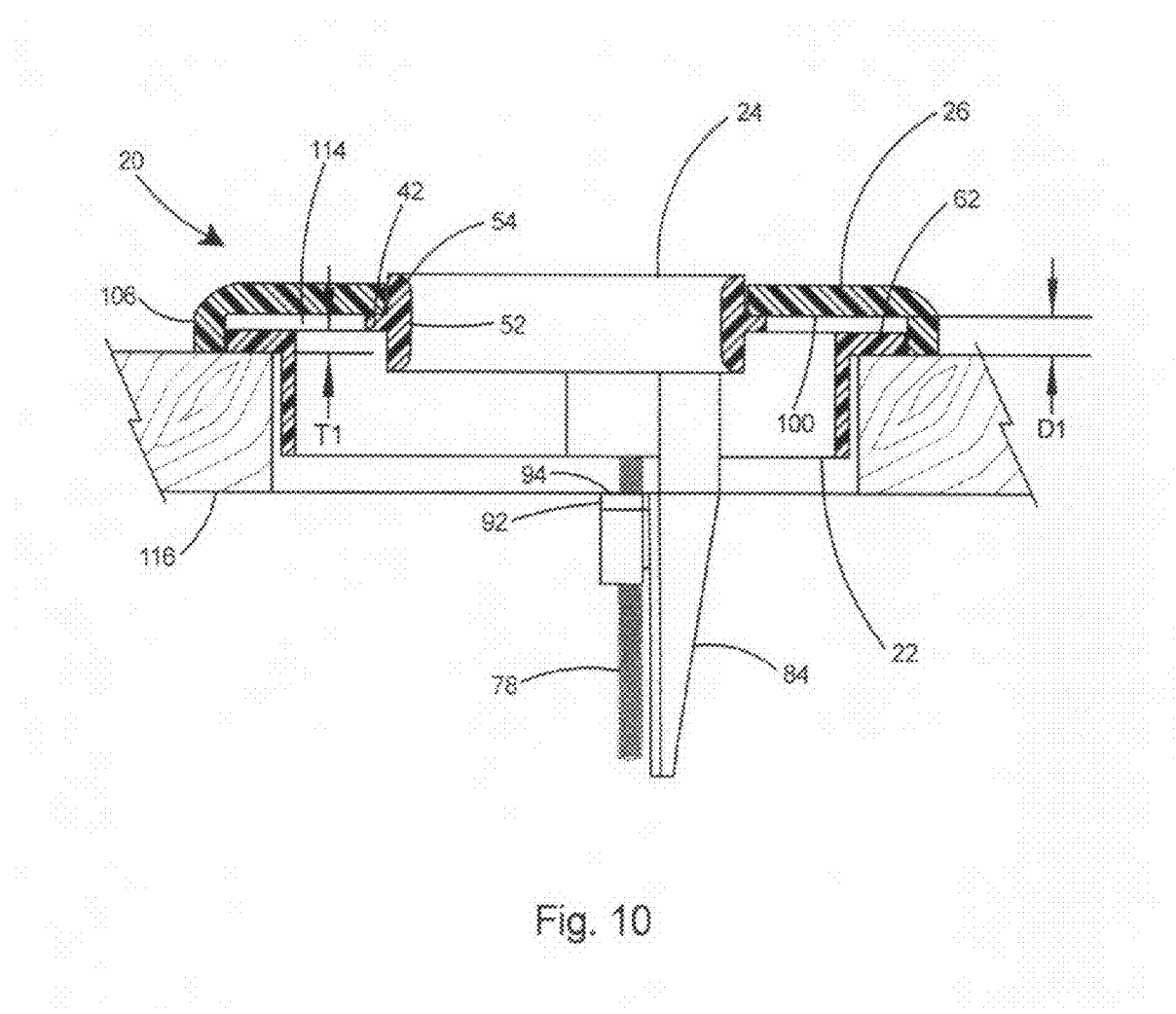
FIG. 10 is a sectional view taken along line 10-10 of FIG. 1 depicting the cable routing assembly secured against a wall.

With reference to FIG. 10, the cable routing assembly 20 of the present invention is depicted in sectional view after being secured to sheetrock or wallboard 116 with flat face 94 of foot 92 engaging the wallboard 116 after tightening of mounting fastener 78. As shown in FIG. 10, the depth D1 of the recessed area 114 of cover plate 26 is sufficient to accommodate nesting of both the protective cable frame 24 and low voltage mounting bracket 22 within the recessed area 114. Thus, when cover plate 26 is secured to the protective cable frame 24, peripheral wall 106 of cover plate 26 is pulled flush against the wallboard 116 and recessed area 114 is large enough to accommodate longitudinal flange 42 of protective cable frame 24 and face flange 62 of low voltage mounting bracket 22. The depth D1 of recessed area 114 is preferably at least 0.10 inch. The face flange 62 of the low voltage mounting bracket 22 includes a thickness T1 and the face flange 62 fits entirely within the recessed area 114 of the cover plate 26 when the cover plate 26 is secured to the protective cable frame 24 and low voltage mounting bracket 22.

Reference is made to FIG. 11 for an understanding of the operation of the present invention. A hole to accommodate the cable routing assembly 20 is made in the wallboard 116. Initial tightening of the mounting fasteners 78 enables each of the tabs 82 to engage the adjacent leg 84 of the low voltage mounting bracket 22 thereby stopping rotation of the rotatable flags 58 and enabling additional tightening of the fasteners to draw each of the rotatable flags 58 toward the wallboard 116. The low voltage mounting bracket 22 is then secured to the wallboard 116 by turning each mounting fasteners 78 of mounting arrangement 56 clockwise until each foot 92 of rotatable flags 58 is drawn tightly against the back side of the wallboard 116. A first fastening arrangement 118 is provided with the cable routing assembly 20 for securing the protective cable frame 24 to the low voltage mounting bracket 22. First fastening arrangement includes fasteners 120 which are driven through the first apertures 32 in the arms 30 of protective cable frame 24 into the second bores 76 in low voltage mounting bracket 22. A second fastening arrangement 122 is provided with the cable routing assembly 20 for securing the cover plate 26 to the protective cable frame 24. The second fastening arrangement 122 for fastening the cover plate 26 to the protective cable frame 24 includes a fastener 124 for securing through each of the apertures 108 in the cover plate 26 into each of the second apertures 34 in the arms 30 of the protective cable frame 24. The apertures 108 in the cover plate 26 are of a spacing and pattern to match the spacing and pattern of the second apertures 34 in the protective cable frame 24.

Figure 12:
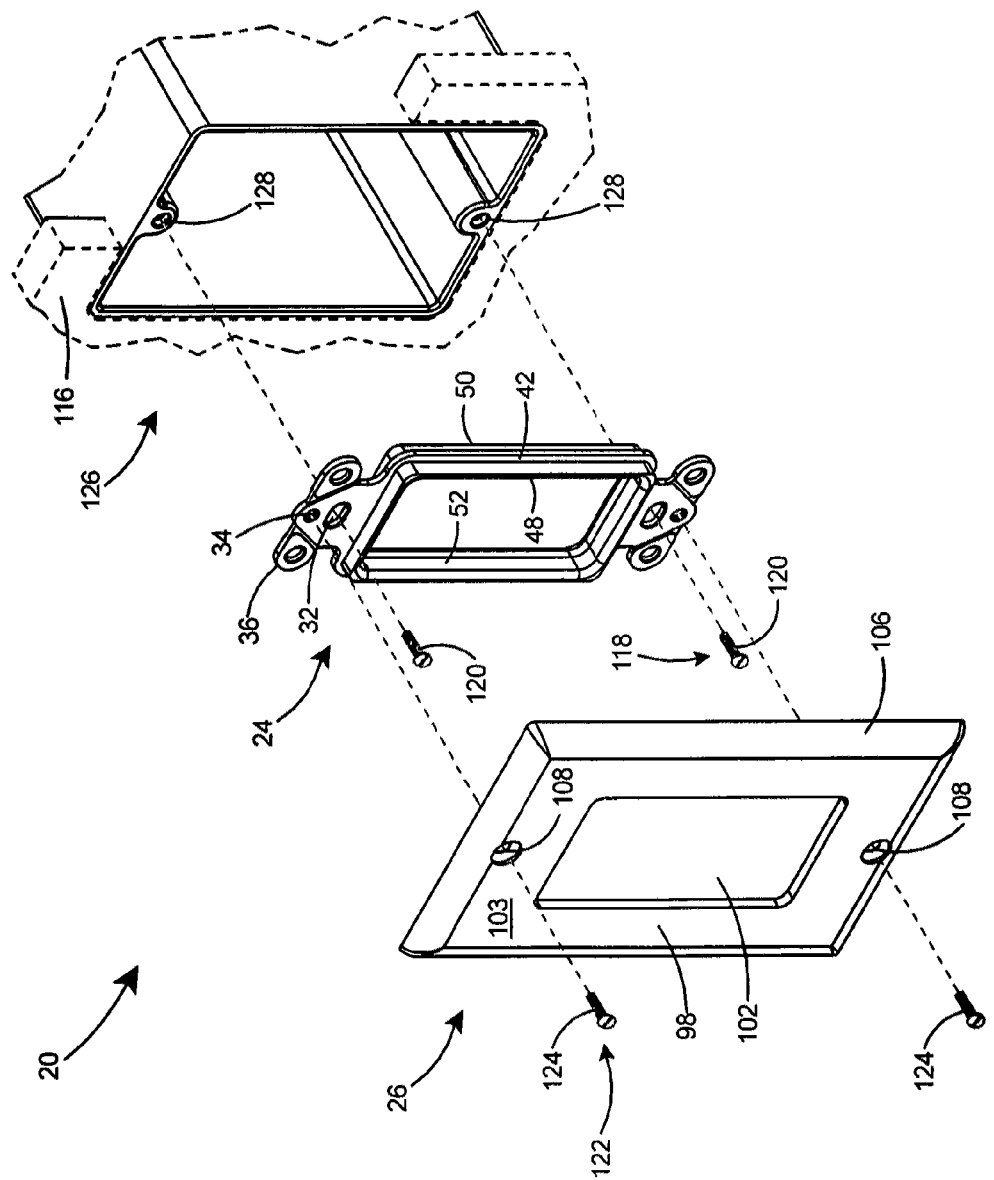
FIG. 12 is an exploded perspective view of a cable routing assembly including the protective cable frame and the decorative cover plate in combination with an electrical box.

Although the cable routing assembly 20 includes a low voltage mounting bracket 22, a protective cable frame 24, and a decorative electrical cover plate 26, it should be understood that the cable routing assembly could also include the protective cable frame 24 and cover plate 26 used in conjunction with an electrical box 126 with bores 128 therein as shown in FIG. 12.

Most preferably, the one-piece frame member 60 of the low voltage mounting bracket 22, the protective cable frame, and the cover plate 26 are each molded in one piece of plastic. Preferably, the plastic is polycarbonate, polyvinyl chloride, acrylonitrile-butadiene styrene, or polyethylene.

Although the description above contains many specific descriptions, materials, and dimensions, these should not be construed as limiting the scope of the invention but as merely providing illustrations of some of the presently preferred embodiments of this invention. Thus the scope of the invention should be determined by the appended claims and their legal equivalents, rather than by the examples given.

What is claimed is:

1. A cable routing assembly for routing cables through a wall comprising:
    a low voltage mounting bracket including a mounting arrangement for securing said low voltage mounting bracket to said wall;
    said mounting arrangement including a plurality of rotatable flags, said rotatable flags capable of being rotated from a retracted orientation to an extended orientation;
    a protective cable frame including two ends, an outer periphery, an arm extending from each of said ends, and an opening therein;
    a longitudinal flange extending around said outer periphery of said protective cable frame and dividing said protective cable frame into a forward peripheral flange and a rearward peripheral flange;
    each of said arms of said protective cable frame including apertures therein;
    a first fastening arrangement for securing said protective cable frame to said low voltage mounting bracket;
    a cover plate including a front side, a rear side, and an opening therein; and
    a second fastening arrangement for fastening said cover plate to said protective cable frame.

2. The cable routing assembly of claim 1 wherein
    said low voltage bracket includes a rectangular shaped one-piece frame member including a face flange having an outer periphery, an inner periphery, and a substantially rectangular opening therein; and
    a collar extending rearward from said inner periphery of said face flange.

3. The cable routing assembly of claim 2 wherein
    said face flange of said low voltage mounting bracket includes two bosses extending inward of said inner periphery into said opening; and
    a first bore and a second bore in each of said bosses, said first bore and said second bore positioned side by side in said bosses.

4. The cable routing assembly of claim 3 wherein
    said mounting arrangement includes a mounting fastener extending through said first bore in each of said bosses in said face flange of said low voltage mounting bracket, each of said mounting fasteners including a distal end;
    one of said rotatable flags on said distal end of each of said mounting fasteners, said rotatable flags including tabs thereon; and
    a leg on said face flange adjacent each of said tabs, said legs extending rearward from said face flange,
    whereby tightening of said mounting fasteners enables each of said tabs to engage said adjacent leg thereby stopping rotation of said rotatable flags and enabling additional tightening of said fasteners to draw each of said rotatable flags toward said frame member.

5. The cable routing assembly of claim 3 wherein
    said apertures in said protective cable frame include a first aperture and a second aperture;
    said second aperture in said arm of said protective cable frame is outward of said first aperture; and
    said first fastening arrangement for securing said protective cable frame to said low voltage mounting bracket includes a fastener for securing through each of said first apertures in said arms of said cable frame into each of said second bores in said bosses of said low voltage mounting bracket.

6. The cable routing assembly of claim 1 wherein said second fastening arrangement for fastening said cover plate to said protective cable frame includes
   a plurality of apertures in said cover plate; and
   a fastener for securing through each of said apertures in said cover plate into each of said second apertures in said arms of said protective cable frame.

7. The cable routing assembly of claim 6 wherein
   said apertures in said cover plate are aligned along a vertical axis through said cover plate;
   said apertures in said cover plate of a spacing and pattern to match the spacing an pattern of said second apertures in said protective cable frame; and
   said apertures in said cover plate include countersunk areas in said front side of said cover plate.

8. The cable routing assembly of claim 1 wherein
   said rotatable flags include a proximal end and a distal end; and
   said proximal end of said rotatable flags includes a bore therein.

9. The cable routing assembly of claim 8 wherein
   said distal end of said rotatable flags includes a foot having a flat face thereon; and
   said foot and flat face on said rotatable flags for engaging said wall with tightening of said mounting arrangement.

10. The cable routing assembly of claim 1 wherein said cover plate includes
    an outer edge and a peripheral wall extending from said outer edge; and
    a recessed area on said rear side of said cover plate formed by said peripheral wall.

11. The cable routing assembly of claim 10 wherein said recessed area of said cover plate is recessed a depth of at least 0.10 inch from said peripheral wall of said cover plate.

12. The cable routing assembly of claim 10 wherein said longitudinal flange and said forward peripheral flange of said protective cable frame fit entirely within said recessed area of said cover plate when said cover plate is secured to said protective cable frame.

13. The cable routing assembly of claim 2 wherein said one-piece frame member, said protective cable frame, and said cover plate are each molded in one piece of plastic.

14. The cable routing assembly of claim 13 wherein said plastic is selected from the group including polycarbonate, polyvinyl chloride, acrylonitrile-butadiene styrene, and polyethylene.

15. A cable routing assembly for routing cables through a wall comprising:
    a low voltage mounting bracket including a mounting arrangement for securing said low voltage mounting bracket to said wall;
    said mounting arrangement including a plurality of rotatable flags, said rotatable flags capable of being rotated from a retracted orientation to an extended orientation;
    a protective cable frame including two ends, an inner periphery, an arm extending from each of said ends, and an opening therein;
    each of said arms of said protective cable frame including apertures therein;
    a first fastening arrangement for securing said protective cable frame to said low voltage mounting bracket;
    a cover plate including a front side, a rear side, and an opening therein;
    a second fastening arrangement for fastening said cover plate to said protective cable frame; and
    said inner periphery of said cable frame includes a center and curved surfaces that curve away from said center, said curved surfaces providing a gradual bend radius to any cables extended through said opening of said protective cable frame.

16. An insert for nesting within the opening in an electrical cover plate comprising:
    a substantially rectangular shaped one-piece frame member including two sides, two ends, an arm extending from each of said ends, and an opening therein;
    said frame member including an inner periphery surrounding said opening and an outer periphery;
    an outer bore and an inner slot aligned along a central longitudinal axis through said frame member;
    a longitudinal flange extending around said outer periphery of said frame member;
    said frame member including a forward peripheral flange extending from a first of said sides and a rearward peripheral flange extending from a second of said sides; and
    a curved surface on said inner periphery of said frame member.

\* \* \* \* \*